(12) United States Patent
Vigelius

(10) Patent No.: US 8,289,011 B2
(45) Date of Patent: Oct. 16, 2012

(54) SWITCHED MODE POWER SUPPLY FOR A TRANSMITTER

(75) Inventor: Kari Olavi Vigelius, Salo (FI)

(73) Assignee: Nokia Corporation, Espoo (FI)

( * ) Notice: Subject to any disclaimer, the term of this patent is extended or adjusted under 35 U.S.C. 154(b) by 518 days.

(21) Appl. No.: 11/999,629

(22) Filed: Dec. 6, 2007

(65) Prior Publication Data
US 2009/0237064 A1 Sep. 24, 2009

(30) Foreign Application Priority Data

Dec. 27, 2006 (GB) .................................. 0625942.8

(51) Int. Cl.
*G05F 1/40* (2006.01)
*G05F 5/00* (2006.01)

(52) U.S. Cl. ........................................ 323/283; 323/299

(58) Field of Classification Search .................. 323/283, 323/299–303
See application file for complete search history.

(56) References Cited

U.S. PATENT DOCUMENTS

| | | | |
|---|---|---|---|
| 6,489,742 B2* | 12/2002 | Lumsden | 318/727 |
| 7,288,924 B2* | 10/2007 | Trandafir et al. | 323/283 |
| 7,514,913 B2* | 4/2009 | Zhang et al. | 323/299 |
| 2005/0218870 A1* | 10/2005 | Lys | 323/222 |
| 2007/0041224 A1* | 2/2007 | Moyse et al. | 363/21.01 |

FOREIGN PATENT DOCUMENTS

GB 2 329 087 A 3/1999

* cited by examiner

*Primary Examiner* — Jessica Han
(74) *Attorney, Agent, or Firm* — Harrington & Smith

(57) ABSTRACT

A switched mode power supply (SMPS) suitable for use with a transmitter is disclosed. A digital signal processing unit, using a reference voltage and a voltage signal from the power source as inputs, determines the duty cycle for a voltage converter, such as a buck-boost converter, of the SMPS.

23 Claims, 7 Drawing Sheets

SWITCHED MODE POWER SUPPLY FOR A TRANSMITTER

FIELD OF THE INVENTION

The present invention is related to providing a switched mode power supply for a transmitter.

BACKGROUND

Most power sources provide a current at a fixed voltage.

In some situations a current at a different or variable voltage level is desired. For example, the transmitter in a cellular device requires a wide output range, but the highest output power is rarely used. Therefore, to ensure that the transmitter can transmit at the highest output power, the power source delivers voltage to the power amplifier for the transmitter at the highest output power.

However, providing voltage continuously at a high level when it is not continuously required for the efficient functioning of a device is a drain on a limited power source, such as a battery for mobile devices.

One method of varying a fixed voltage is by using a switched mode power supply (SMPS).

A SMPS uses a duty cycle to determine the frequency of switching in a voltage converter to determine the voltage level at the output of the voltage converter.

There are several different types of voltage converters for SMPSes including buck converters which decrease voltage, boost converters which increase voltage and buck/boost converters which can either increase or decrease voltage.

In existing systems a controller uses a reference voltage and a control loop to determine the duty cycle. The control loop feeds an output of the voltage converter back to the controller.

However, the use of a control loop can cause difficulties. For example, the control loop may become unstable, when output voltage is at the maximum for buck converter, or, in case of buck-boost converter, when the output voltage is about equal to the battery voltage. These instabilities can create extra noise in the output voltage. This is disadvantageous when the output voltage is provided to a component which is vulnerable to noise such as the power amplifier for signal transmissions. In such cases the radio frequency transmitted signal can be reduced in quality due to the noise.

There is a desire for a SMPS which minimises noise generation in the output voltage.

It is an object of the present invention to provide a switched mode power supply which minimises noise generation in the output voltage, or at least provides a useful alternative.

SUMMARY

According to an embodiment of the invention there is provided a switched mode power supply, comprising a switched mode voltage converter configured to receive a current from a power source at a first voltage, to receive signals of a duty cycle for switching on/off the current, and to generate a current at a second voltage. The power supply also comprises a digital signal processor configured to receive a voltage reference and a power source voltage reference, and, on the basis of these references, to generate the duty cycle for the switched mode voltage converter.

The switched mode power supply may include a digital to analogue converter for converting the duty cycle of the digital signal processor into analogue signals for the switch mode voltage converter. The digital to analogue converter may be a pulse width modulated digital to analogue converter.

The switched mode power supply may include an analogue to digital converter for converting the voltage of the power source into the power source voltage reference for the digital signal processor.

The switched mode voltage converter may be a buck converter or a buck-boost converter.

According to another embodiment there is provided a method comprising receiving by a digital signal processor a reference signal specifying a first voltage; receiving by the digital signal processor a reference signal specifying a second voltage; generating by the digital signal processor a duty cycle signal on the basis of the received reference signals; receiving by a switched mode voltage converter the duty cycle signal; switching the switched mode voltage converter in accordance with the duty cycle signal; and converting current received from the power supply into current at the first voltage by the switched mode voltage converter.

According to a further embodiment there is provided a power supply comprising first means for receiving a current from a power source at a first voltage, signals of a duty cycle for switching said current and for generating a current at a second voltage; and second means for receiving a voltage reference and a power source voltage reference and on the basis of said references generating the duty cycle for the first means.

Switch mode power supply using a feedback loop may comprise a control part for feedback signal. The control part can combine together a control signal from reference source and the feedback signal.

A control part of switch mode power supply in accordance with one embodiment of the present invention can be realized with a digital signal processor or the like that may exist for other purposes for instance in a mobile telephone. That existing digital signal processor may be shared with switch mode power supply, because adjustments of voltages and capacity of digital signal processing are needed only occasionally for SMPS.

According to one embodiment of this invention it is possible to remove some hardware circuitry and replace it with calculation in a digital signal processor.

BRIEF DESCRIPTION OF THE DRAWINGS

Embodiments of the invention will now be described, by way of example only, with reference to the accompanying drawings in which.

DETAILED DESCRIPTION OF CERTAIN EMBODIMENTS

The herein described embodiments provide a switched mode power supply (SMPS) suitable for use with a transmitter. A digital signal processing unit, using a reference voltage and a voltage signal from the power source as inputs, determines the duty cycle for the SMPS.

Figure 1:
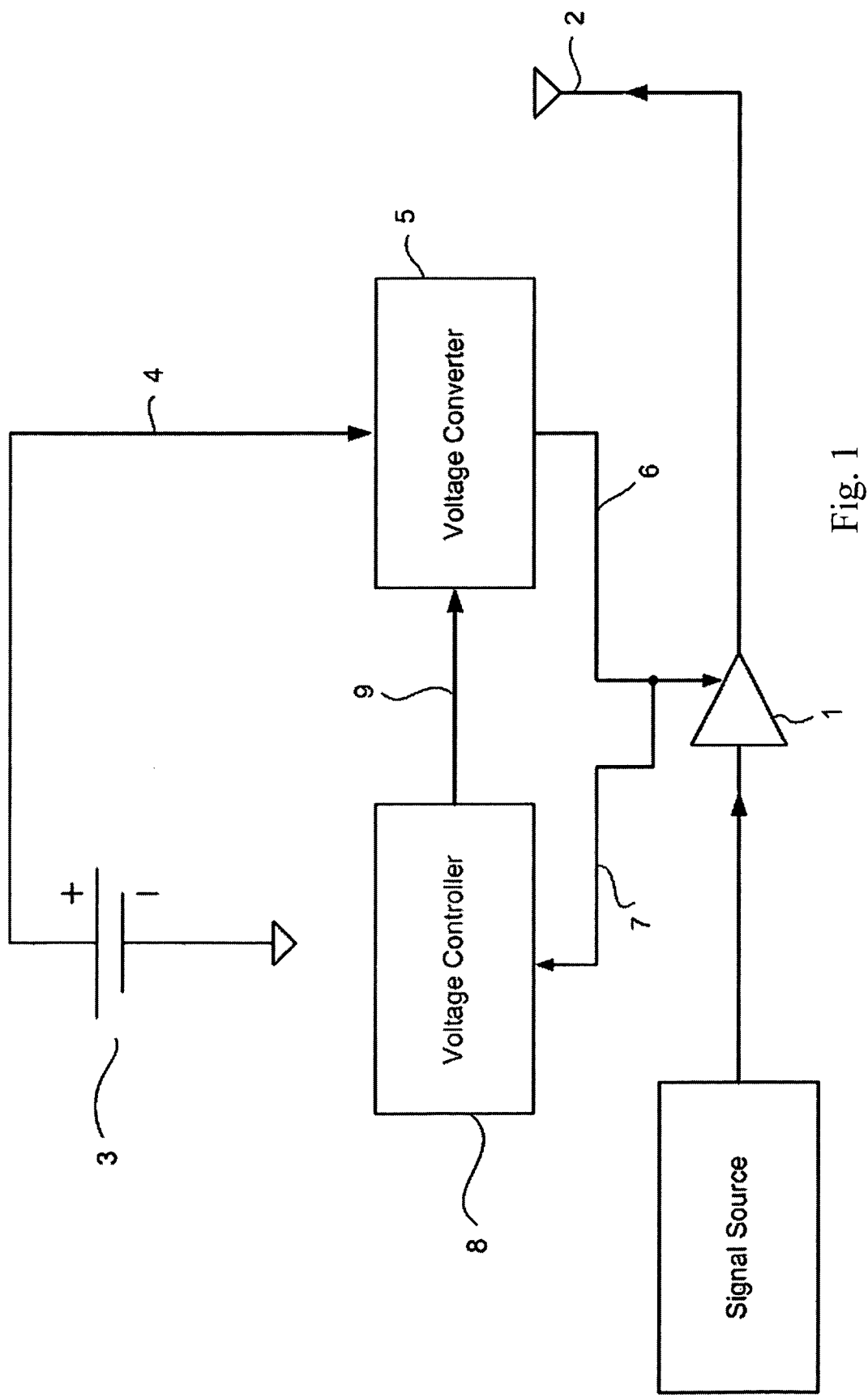
FIG. 1: shows a switch mode power supply using a control loop in accordance with the prior art.

FIG. 1 shows a prior art example of a switched mode power supply for a power amplifier 1 for a transmitter 2.

A battery 3 provides a voltage 4 to a voltage converter 5 which provides the voltage 6 to the power amplifier 1. A control line 7 from the power amplifier 1 provides the output voltage from the voltage converter to a voltage controller 8.

The voltage controller controls 9 the switches within the voltage converter to converge the output voltage to the desired voltage.

The voltage output 6 from the voltage converter, the control line 7 to the voltage controller and the control signals 9 to the switches in the voltage converter form the control loop.

Figure 2:
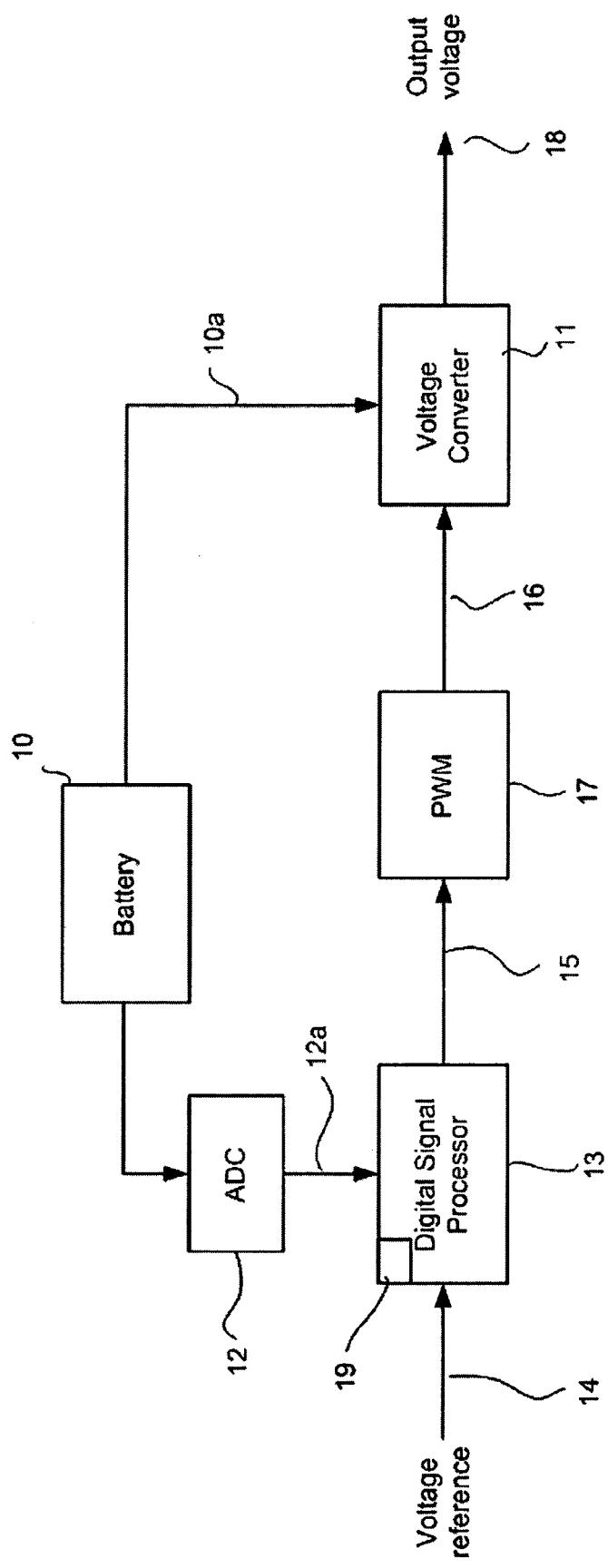
FIG. 2: shows a diagram illustrating a switch mode power supply in accordance with an embodiment of the invention.

FIG. 2 shows an embodiment in accordance with the invention.

A power source 10, such as a battery, provides a voltage 10a to a voltage converter 11.

The power source 10 also provides a voltage to an analogue to digital converter (ADC) 12 which provides a digital signal 12a to a digital signal processor (DSP) 13.

The ADC 12 can be a separate block or included within the DSP 13.

The digital signal processor 13 receives a digital signal 14 of a reference voltage that is the desired output voltage from the voltage converter.

The digital signal 14 may be received from a look-up table (not shown).

Based on data 14 received from the look up table and the power source voltage received via the ADC 12 the digital signal processor 13 calculates the duty cycle that is required to convert the voltage of the power source into the desired output voltage.

The digital signal processor transmits control signals 15 for the switches within the voltage converter in accordance with the calculated duty cycle.

The control signals 15 are converted into analogue control signals 16 using a digital to analogue converter 17.

The digital to analogue converter may be a pulse width modulated (PWM) digital to analogue converter.

The analogue control signals 16 control the switching of switches within the voltage converter 11.

The voltage converter 11 converts the voltage 10a from the power source into an output voltage 18.

As can be seen, there is no feedback loop necessary from the output voltage of the voltage converter to the DSP or the PWM.

Output voltage loading and the effect of output voltage on different power levels of power amplifier can be measured and/or simulated in advance. Measurement and simulation results may be used as fixed or updatable correction factors for the DSP to use for determining the duty cycle of switching in the voltage converter when the power level is changed.

Correction factors can be stored in a look-up table 19 for use by the DSP or in another memory.

The output voltage may be provided to a power amplifier (not shown) for amplifying signals for transmission.

Figure 3:
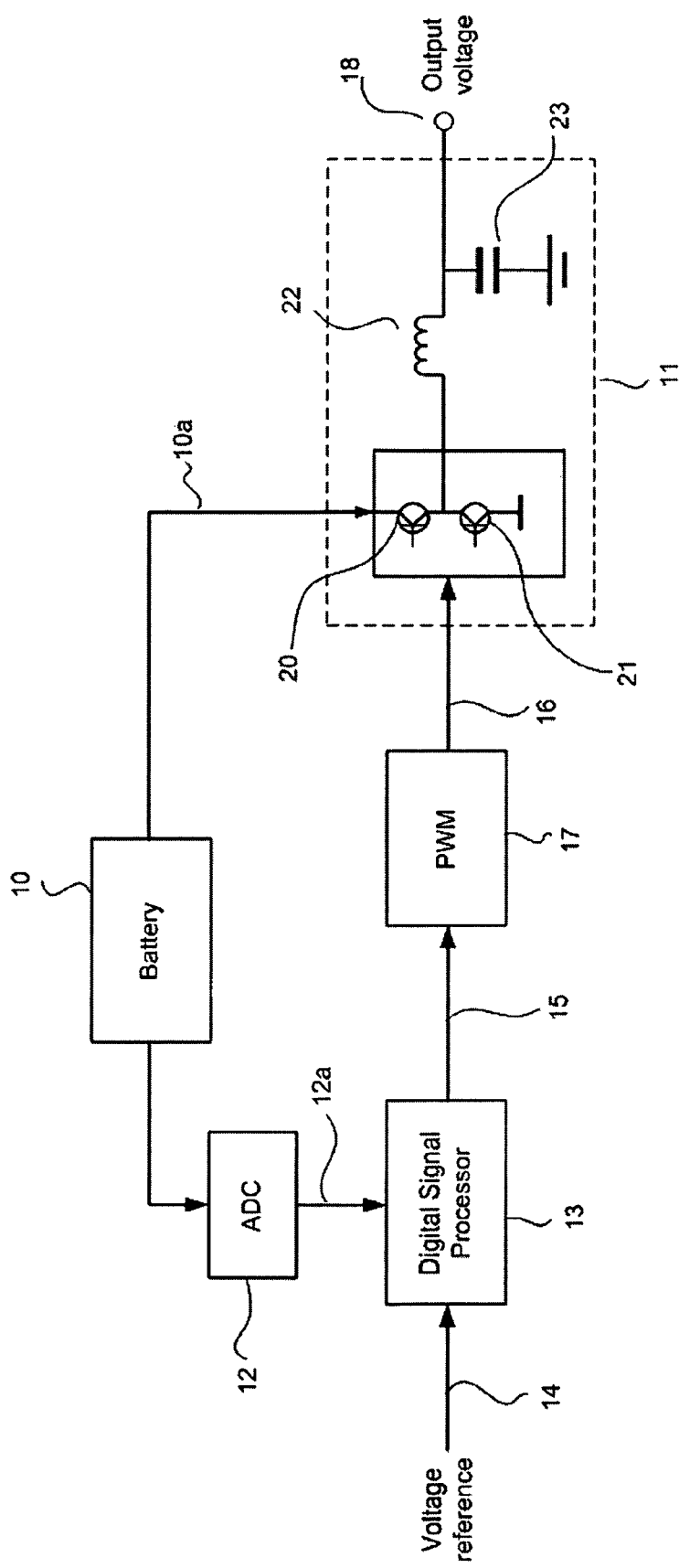
FIG. 3: shows a diagram illustrating a switch mode power supply in accordance with an embodiment of the invention.

FIG. 3 shows an embodiment where the voltage converter 11 is a buck converter.

The buck converter includes two switches 20 and 21. Each switch is controlled by signals 16 originating from the digital signal processor 13.

The buck converter includes an inductor 22 and a capacitor 23. The basic functioning of a buck converter is known to those skilled in the art.

Figure 4:
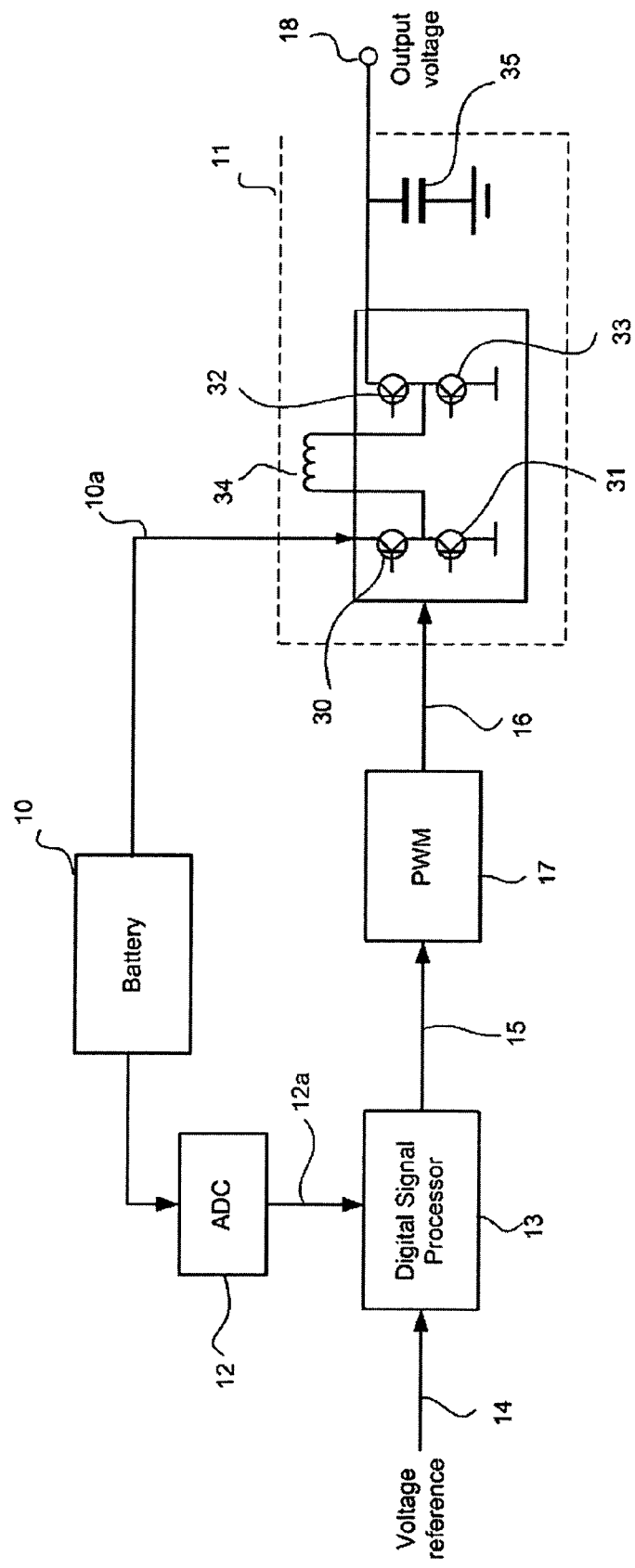
FIG. 4: shows a diagram illustrating a switch mode power supply in accordance with an embodiment of the invention.

FIG. 4 shows an embodiment where the voltage converter 11 is a buck-boost converter.

The buck-boost converter includes switches 30, 31, 32, and 33. The converter includes an inductor 34 and a capacitor 35.

The buck-boost converter has three different working modes. The digital signal processor 13 decides which mode must be used based on battery voltage and desired output voltage.

If the desired output voltage is lower than battery voltage, the converter is set to buck mode. The 32 is switched ON, 33 is switched OFF, and switches 30 and 31 as switched on and off according to the duty cycle as set by the DSP.

If the desired output voltage is higher than battery voltage, the boost mode is selected. 30 is switched ON, 31 is switched OFF, and the 32 and 33 are switched according to the duty cycle set by the DSP. With ideal components the output voltage is 1/(duty cycle)*(battery voltage).

If the desired voltage is almost the same as battery voltage, the DSP can set the converter to feed through mode: 30 and 32 are switched ON, 31 and 33 are switched OFF.

The switched mode power supply may be used to provide power to a power amplifier for a transmitter, such as for a mobile cellular device.

It will be appreciated that, with appropriate modifications, the present invention may utilise other voltage converters which utilise a duty cycle to convert the voltage.

Figure 5:
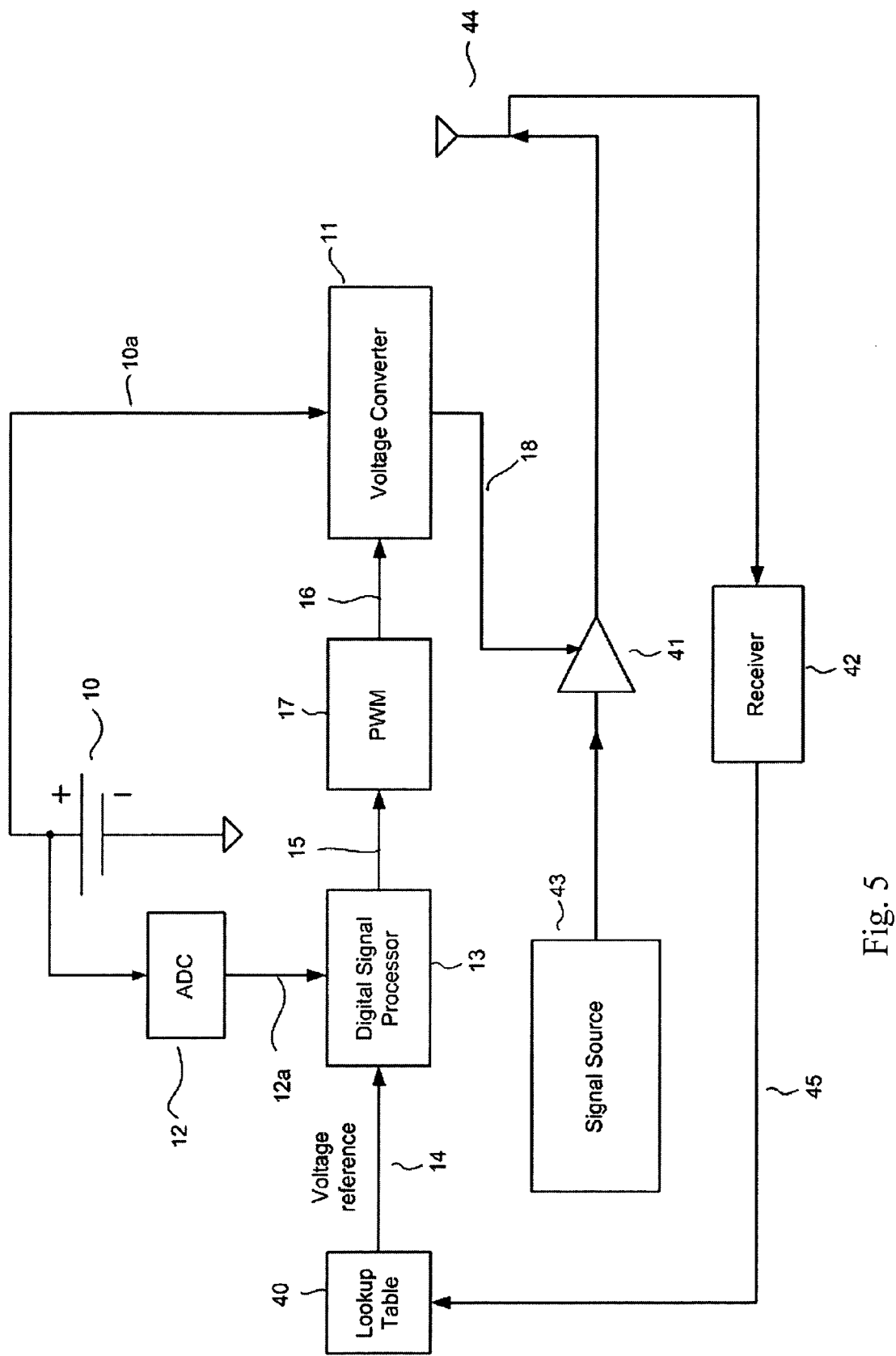
FIG. 5: shows a diagram illustrating a switch mode power supply providing power to a power amplifier for a transmitter in accordance with an embodiment of the invention.

FIG. 5 shows an example where a switched mode power supply embodying the invention is used to provide power to a power amplifier for a transmitter.

A battery 10 provides a voltage 10a to a voltage converter 11.

The battery 10 also provides a voltage to an analogue to digital converter 12 which provides a digital signal 12a to a digital signal processor (DSP) 13.

The ADC 12 can be a separate block or included within the DSP 13.

The digital signal processor 13 receives a digital signal 14 of a reference voltage that is the desired output voltage from the voltage converter.

The digital signal 14 may be received from a look-up table 40. The lookup table 40 may contain data of power levels used in a transmitter power amplifier 41. Data from the look-up table 40 may be provided as a voltage reference in the digital signal 14 based on power control messages received from a wireless telephone network by a receiver 42.

Based on data received from the look-up table 40 and the battery voltage received via the ADC 12 the digital signal processor 13 calculates the duty cycle that is required to convert the voltage of the battery 10 into the desired output voltage.

The digital signal processor transmits control signals 15 for the switches within the voltage converter 11 in accordance with the calculated duty cycle.

The control signals 15 are converted into analogue control signals 16 using a digital to analogue converter 17.

The digital to analogue converter may be a pulse width modulated (PWM) digital to analogue converter.

The analogue control signals 16 control the switching of switches within the voltage converter 11.

The voltage converter 11 converts the voltage 10a from the power source into an output voltage 18.

The output voltage 18 is provided to a power amplifier 41 for amplifying signals from a signal source 43 for transmission from an antenna 44.

A receiver 42 may receive and process signals received by the antenna 44. Power control messages 45 received by the receiver 43 may be used by the look-up table 40 to determine the voltage reference to provide to the DSP 13.

Figure 6:
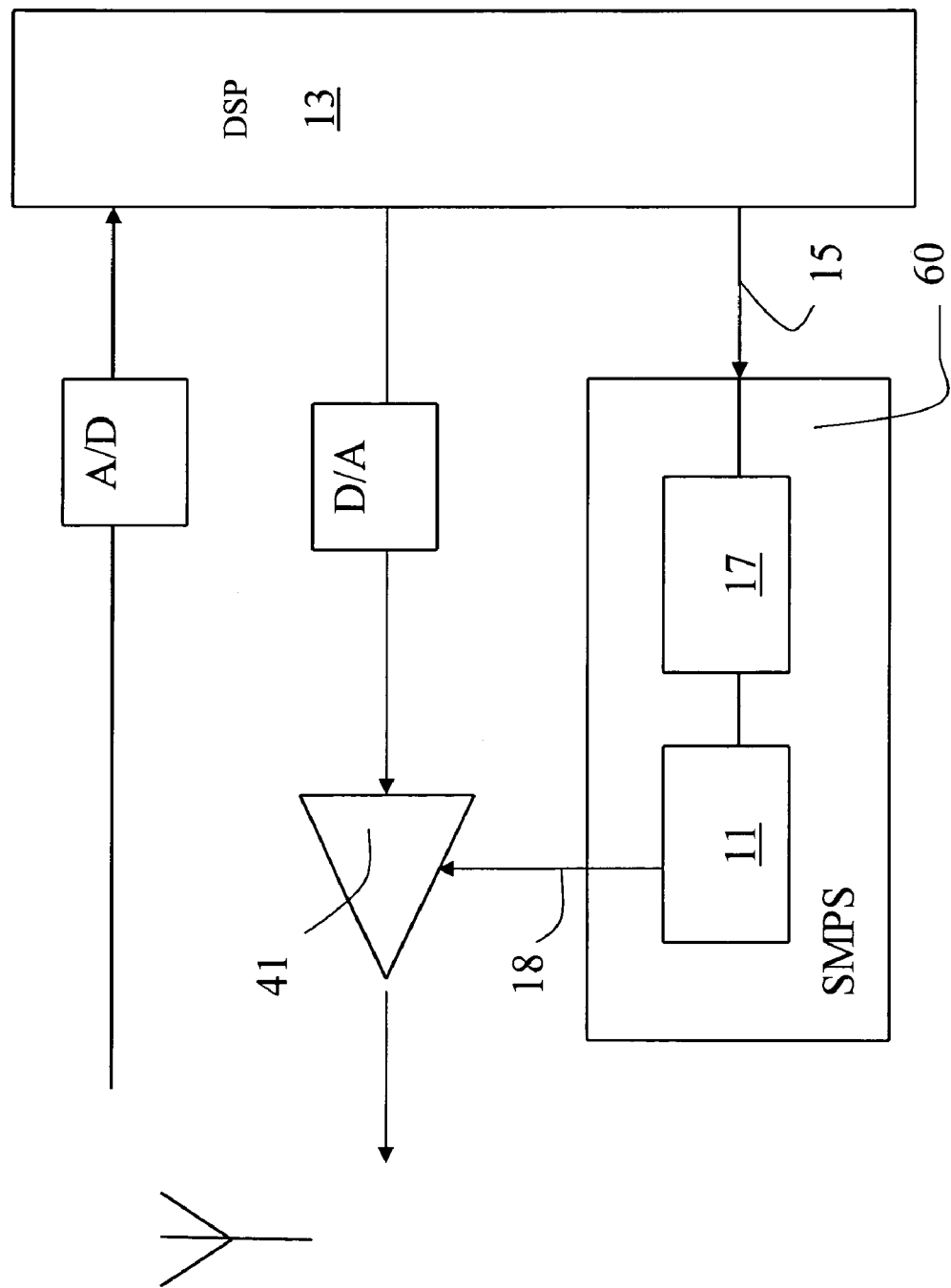
FIG. 6: shows a diagram illustrating a further embodiment.

FIG. 6 exemplifies an embodiment that can be provided, for example, in the arrangement of FIG. 5. In FIG. 6 components 11, 13, 17 and 41 and signals 15 and 18 correspond to those of FIG. 5. More particularly, FIG. 6 illustrates the possibility of having a circuitry where a switched mode power supply functionality shares a digital signal processor (DSP) with other operations. Thus FIG. 6 illustrates schematically an advantage of the present invention in that the core of a switched mode power supply (SMPS) 60 can be kept relatively simple. This is so because the SMPS functions can share the DSP with other operations of the communication device, for example a mobile phone or another mobile station and thus control functions/blocks can be omitted from the SMPS core 60. A reason enabling spreading of SMPS functions over the other parts of the circuitry is that there is no feedback loop.

According to a possibility even the pulse width modulated digital to analogue converted function 17 can be provided outside the core switched mode power supply (SMPS) 60 of FIG. 6.

A number of functions of a communication device can use the resources of a digital signal processor. Also, a distributed arrangement is possible where a plurality of digital signal processor can be provided such that they may serve a plurality of functions.

Figure 7:
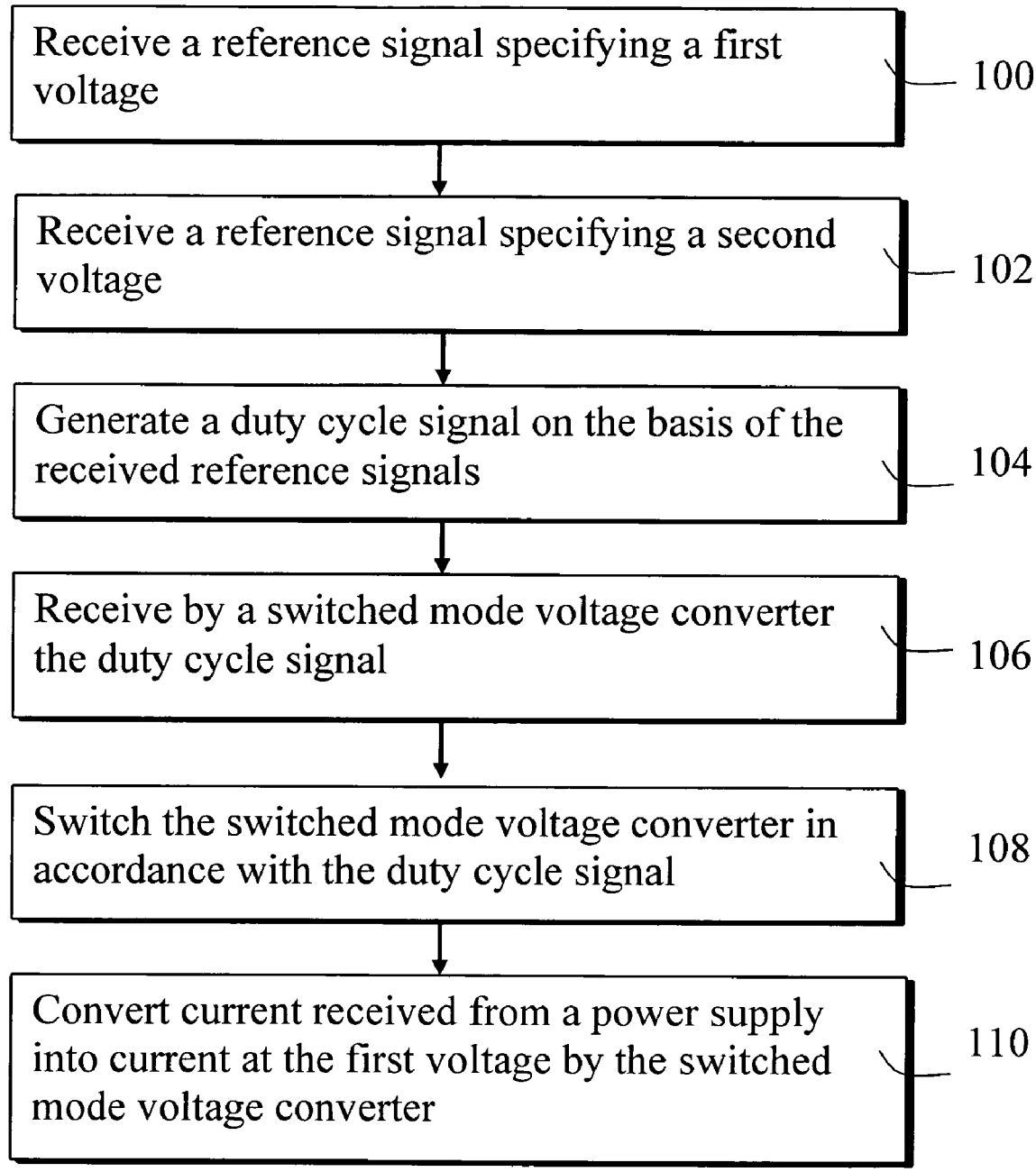
FIG. 7: shows a flowchart in accordance with an embodiment of the invention.

FIG. 7 shows a flowchart in accordance with an embodiment. In step 100 a reference signal is received, for example by a digital signal processor as described above. The reference signal specifies a first voltage. In step 102 the digital signal processor receives another reference signal specifying a second voltage. The received reference signals are then used at 104 to generate a duty cycle signal. It is noted that steps 100 and 102 may occur in any order and/or at least partially in parallel.

A switched mode voltage converter may then receive the duty cycle signal at 106. The switched mode voltage converter can be switched in accordance with the duty cycle signal at 108. A current received from the power supply can then be converted at 110 into current at the first voltage by the switched mode voltage converter.

Embodiments of the present invention provide the advantage that a voltage output may be increased or decreased from a fixed power source whilst minimising noise in the voltage output, such as is caused by switched mode power supplies using control loops. Therefore the voltage output is suitable for provision to a power amplifier for transmission of data signals.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. An apparatus comprising:
    a switched mode voltage converter configured to receive a current from a power source at a first voltage, to receive signals of a duty cycle for switching on/off the current, and to generate a current at a second voltage;
    a digital signal processor configured to receive a voltage reference, the voltage reference being a desired output voltage for the voltage converter, and a power source voltage reference, and, on the basis of these references, to generate the duty cycle for the switched mode voltage converter without a feedback loop; and
    an analogue to digital converter for converting the voltage of the power source into the power source voltage reference for the digital signal processor.

2. The apparatus as claimed in claim 1 comprising a digital to analogue converter for converting the duty cycle of the digital signal processor into analogue signals for the switch mode voltage converter.

3. The apparatus as claimed in claim 2 wherein the digital to analogue converter is a pulse width modulated digital to analogue converter.

4. The apparatus as claimed in claim 2, comprising a core switched mode power supply circuitry, wherein the digital to analogue converter is provided outside the core switched mode power supply circuitry.

5. The apparatus as claimed in claim 1, wherein the switched mode voltage converter is selected from the set of a buck converter and a buck-boost converter.

6. The apparatus as claimed in claim 1, comprising a lookup module arranged for providing the voltage reference.

7. The apparatus as claimed in claim 6 wherein the lookup module is configured to provide the voltage reference based, at least in part, on receiving power control messages.

8. The apparatus as claimed in claim 1, wherein the digital signal processor is configured to generate the duty cycle on the basis of data extracted from a second lookup module.

9. The apparatus as claimed in claim 8, wherein the data within the second lookup module is based on earlier measurements and/or simulations of output voltage loading.

10. The apparatus as claimed in claim 1, comprising a core switched mode power supply circuitry configured to share resources of the digital signal processor with at least one other circuitry.

11. The apparatus as claimed in claim 10, wherein the digital signal processor is provided outside the core switched mode power supply circuitry.

12. A method comprising:
    receiving by a digital signal processor a voltage reference signal specifying a desired output voltage;
    receiving by the digital signal processor a power source voltage reference signal specifying a power source voltage, the voltage of the power source being converted by an analogue to digital converter into the power source voltage reference;
    generating by the digital signal processor a duty cycle signal on the basis of the received reference signals;
    receiving by a switched mode voltage converter the duty cycle signal;
    switching the switched mode voltage converter in accordance with the duty cycle signal; and
    converting current received from the power source into current at a first voltage corresponding to the desired output voltage by the switched mode voltage converter without a feedback loop.

13. The method of claim 12, comprising converting the duty cycle signal into an analogue signal for the switched mode voltage converter.

14. The method as claimed in claim 12, comprising converting the voltage of the power source into the power source voltage reference for the digital signal processor.

15. The method as claimed in claim 12, comprising providing the reference signal by a lookup module.

16. The method as claimed in claim 15 comprising providing the reference signal based, at least in part, on power control messages.

17. The method as claimed in claim 12, comprising generating the duty cycle on the basis of data extracted from a lookup module.

18. The method as claimed in claim 12, comprising sharing resources of the digital signal processor between the switched mode voltage converter and at least one other functionality of a communications device.

19. User equipment comprising:
a switched mode power supply, comprising:
a switched mode voltage converter configured to receive a current from a power source at a first voltage, to receive signals of a duty cycle for switching on/off the current, and to generate a current at a second voltage;
a digital signal processor configured to receive a voltage reference, the voltage reference being a desired output voltage for the voltage converter, and a power source voltage reference, and, on the basis of these references, to generate the duty cycle for the switched mode voltage converter without a feedback loop; and
an analogue to digital converter for converting the voltage of the power source into the power source voltage reference for the digital signal processor;
a power amplifier configured to amplify signals for transmission; and
a transmitter configured to transmit the amplified signals;
wherein the power amplifier is powered by the switched mode power supply.

20. The user equipment as claimed in claim 19, wherein said user equipment comprises a mobile device.

21. A power supply comprising:
first means for receiving a current from a power source at a first voltage, signals of a duty cycle for switching said current and for generating a current at a second voltage; and
second means for receiving a voltage reference, the voltage reference being a desired output voltage for the voltage converter, and a power source voltage reference, the voltage of the power source being converted by an analogue to digital converter into the power source voltage reference, and on the basis of said references generating the duty cycle for the first means without a feedback loop.

22. The power supply as claimed in claim 21 comprising means for converting the duty cycle of the digital signal processor into analogue signals.

23. The power supply as claimed in claim 21, comprising means for converting the voltage of the power source into the power source voltage reference for a digital signal processor.

* * * * *